(12) United States Patent
Jeong et al.

(10) Patent No.: US 12,731,808 B2
(45) Date of Patent: Sep. 8, 2026

(54) MONO-CELL MANUFACTURING APPARATUS WITH GLOSS METER AND MANUFACTURING METHOD USING THE SAME

(71) Applicant: LG Energy Solution, Ltd., Seoul (KR)

(72) Inventors: Hyeok Jeong, Daejeon (KR); Seok Hoon Jang, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 753 days.

(21) Appl. No.: 18/011,626

(22) PCT Filed: Mar. 10, 2022

(86) PCT No.: PCT/KR2022/003325
§ 371 (c)(1),
(2) Date: Dec. 20, 2022

(87) PCT Pub. No.: WO2022/211299
PCT Pub. Date: Oct. 6, 2022

(65) Prior Publication Data

US 2023/0343982 A1 Oct. 26, 2023

(30) Foreign Application Priority Data

Mar. 31, 2021 (KR) ........................ 10-2021-0042352
Jan. 21, 2022 (KR) ........................ 10-2022-0009455

(51) Int. Cl.
*H01M 10/04* (2006.01)
*G01N 21/57* (2006.01)
(Continued)

(52) U.S. Cl.
CPC ............ *H01M 10/04* (2013.01); *G01N 21/57* (2013.01); *G01N 21/8914* (2013.01); *H01M 50/446* (2021.01); *H01M 50/451* (2021.01)

(58) Field of Classification Search
CPC ............. H01M 10/04; H01M 10/0404; H01M 50/451; H01M 50/446
See application file for complete search history.

(56) References Cited

U.S. PATENT DOCUMENTS

2011/0081583 A1 4/2011 Sugimoto et al.
2016/0036087 A1 2/2016 Na et al.
(Continued)

FOREIGN PATENT DOCUMENTS

CN 106797034 A 5/2017
CN 109952678 A 6/2019
(Continued)

OTHER PUBLICATIONS

International Search Report for PCT/KR2022/003325 mailed Jun. 21, 2022. 3 pgs.

(Continued)

*Primary Examiner* — Jonathan G Jelsma
(74) *Attorney, Agent, or Firm* — Lerner David LLP

(57) ABSTRACT

The present invention relates to a mono-cell manufacturing apparatus with a gloss meter and a manufacturing method using the same. More particularly, a mono-cell manufacturing apparatus includes a first separator supply unit configured to supply a first separator; a negative electrode supply unit configured to locate a negative electrode at an upper surface of the first separator; a second separator supply unit configured to supply a second separator configured to cover an upper surface of the negative electrode; a positive electrode supply unit configured to locate a positive electrode at an upper surface of the second separator; a pressing unit configured to press the first separator, the negative electrode, the second separator, and the positive electrode, and a gloss meter located under the first separator.

8 Claims, 7 Drawing Sheets

(51) Int. Cl.

| | |
|---|---|
| ***G01N 21/89*** | (2006.01) |
| ***H01M 50/446*** | (2021.01) |
| ***H01M 50/451*** | (2021.01) |

(56) References Cited

U.S. PATENT DOCUMENTS

2016/0336568 A1 11/2016 Umeyama et al.
2017/0047559 A1 2/2017 Yoo et al.
2017/0092919 A1* 3/2017 Ogata ................. H01M 50/581
2017/0125768 A1 5/2017 Ogata et al.
2017/0263979 A1 9/2017 Hanazaki
2018/0183030 A1 6/2018 Suzuki et al.
2018/0316042 A1 11/2018 Kuhara
2019/0215944 A1 7/2019 Lee et al.
2019/0252730 A1* 8/2019 Fujiwake .............. H01M 4/043
2019/0324089 A1 10/2019 Kang et al.
2020/0067051 A1 2/2020 Yamashita et al.
2020/0235433 A1 7/2020 Kim et al.
2022/0131175 A1 4/2022 Lee et al.

FOREIGN PATENT DOCUMENTS

CN 110352521 A 10/2019
EP 3955364 A1 2/2022
JP 4794824 B2 10/2011
JP 2016012549 A 1/2016
JP 2016213133 A 12/2016
JP 2017510940 A 4/2017
JP 2018174124 A 11/2018
KR 20100132927 A 12/2010
KR 20170127723 A 11/2017
KR 20180119946 A 11/2018
KR 20190000589 A 1/2019
KR 20190006920 A 1/2019
KR 20190134068 A 12/2019
KR 20200109042 A 9/2020
KR 20200113823 A 10/2020
KR 20200131181 A 11/2020
KR 20200137186 A 12/2020

OTHER PUBLICATIONS

Extended European Search Report including Written Opinion for Application No. 22781420.9 dated Mar. 21, 2025, pp. 1-9.
Search Report dated Jun. 18, 2025 from the Office Action for Chinese Application No. 202280005118.6 issued Jun. 20, 2025, pp. 1-2.

* cited by examiner

FIG. 6

MONO-CELL MANUFACTURING APPARATUS WITH GLOSS METER AND MANUFACTURING METHOD USING THE SAME

CROSS-REFERENCE TO RELATED APPLICATIONS

The present application is a national phase entry under 35 U.S.C § 371 of International Application No. PCT/KR2022/003325 filed Mar. 10, 2022, which claims priority from Korean Patent Application No. 10-2021-0042352 filed on Mar. 31, 2021 and Korean Patent Application No. 10-2022-0009455 filed on Jan. 21, 2022, all of which are incorporated herein by reference.

TECHNICAL FIELD

The present invention relates to a mono-cell manufacturing apparatus with a gloss meter and a manufacturing method using the same, and more particularly to a mono-cell manufacturing apparatus with a gloss meter capable of immediately checking whether a mono-cell is abnormal and furthermore rapidly inspecting the mono-cell, thereby reducing defective products and improving production efficiency, and a manufacturing method using the same.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

When the secondary battery is used in a device that requires large capacity and high voltage, such as an electric vehicle, the secondary battery is used in the form of a battery module or a battery pack configured to have a structure in which a plurality of battery cells is arranged.

Meanwhile, when a mono-cell constituting an electrode assembly is manufactured, a lamination process, i.e. a process of simultaneously applying pressure and heat in order to bring a positive electrode, a negative electrode, and separators constituting the mono-cell into tight contact with each other and to adhere the same to each other, is performed. At this time, the separators may be deformed due to excessive pressure and heat, or the force of adhesion between the mono-cell components may be low due to lack of pressure and heat, whereby the mono-cell may be defective.

In connection therewith, FIG. 1 is a perspective view of a conventional mono-cell manufacturing apparatus. Referring to FIG. 1, the conventional mono-cell manufacturing apparatus includes supply rollers 20 configured to supply electrodes 11 and 13 and separators 12 and 14 so as to be alternately stacked, a first cutter 30 configured to cut the electrodes 11 and 13, a laminator 40 configured to thermally fuse the electrodes 11 and 13 and the separators 12 and 14 to manufacture a basic unit sheet, and a second cutter 50 configured to cut the basic unit sheet to a predetermined size to form a mono-cell 10.

After the mono-cell 10 is manufactured, defect determination work to check whether the mono-cell is abnormal is performed. When a supplied separator is abnormal during a manufacturing process, such as a fusion process or a cutting process, however, there is a high possibility of determining that all mono-cells produced on the same line are defective, whereby a plurality of mono-cells may be discarded. In addition, it takes a certain amount of time until determination results are obtained, whereby production efficiency may be reduced.

DISCLOSURE

Technical Problem

The present invention has been made in view of the above problems, and it is an object of the present invention to provide a mono-cell manufacturing apparatus with a gloss meter capable of immediately checking whether a cut mono-cell is abnormal and performing feedback, thereby reducing the number of discarded mono-cells, and a manufacturing method using the same.

It is another object of the present invention to provide a mono-cell manufacturing apparatus with a gloss meter capable of rapidly determining whether a mono-cell is defective, thereby improving production process efficiency, and a manufacturing method using the same.

Technical Solution

In order to accomplish the above objects, a mono-cell manufacturing apparatus with a gloss meter according to the present invention includes a first separator supply unit (100) configured to supply a first separator (110), a negative electrode supply unit (200) configured to locate a negative electrode (210) at an upper surface of the first separator (110), a second separator supply unit (300) configured to supply a second separator (310) configured to cover an upper surface of the negative electrode (210), a positive electrode supply unit (400) configured to locate a positive electrode (410) at an upper surface of the second separator (310), a pressing unit (500) configured to press the first separator (110), the negative electrode (210), the second separator (310), and the positive electrode (410), and a gloss meter (600) located under the first separator (110).

Also, in the mono-cell manufacturing apparatus according to the present invention, the first separator supply unit (100) may include a first separator (110), a first separator supply roller (120) having the first separator (110) wound therearound, and a first guide roller (130) configured to guide transfer of the first separator (110).

Also, in the mono-cell manufacturing apparatus according to the present invention, the negative electrode supply unit (200) may include a negative electrode (210), a negative electrode supply roller (220) having the negative electrode (210) wound therearound, a first cutting unit (230) configured to cut the negative electrode (210) at predetermined intervals, and a first vision camera (240) configured to check the seated position of the negative electrode (210).

Also, in the mono-cell manufacturing apparatus according to the present invention, the second separator supply unit (300) may include a second separator (310), a second separator supply roller (320) having the second separator (310) wound therearound, and a second guide roller (330) configured to guide transfer of the second separator (310).

Also, in the mono-cell manufacturing apparatus according to the present invention, the positive electrode supply unit (400) may include a positive electrode (410), a positive electrode supply roller (420) having the positive electrode (410) wound therearound, a second cutting unit (430) configured to cut the positive electrode (410) at predetermined intervals, and a second vision camera (440) configured to check the seated position of the positive electrode (410).

Also, in the mono-cell manufacturing apparatus according to the present invention, the pressing unit (500) may include a pair of pressing rollers (510) configured to press a stack constituted by the first separator (110), the negative electrode (210), the second separator (310), and the positive electrode (410) stacked in that order at a predetermined pressure and a third cutting unit (520) configured to cut the first separator (110) and the second separator (310) at predetermined intervals.

Also, in the mono-cell manufacturing apparatus according to the present invention, the gloss meter (600) may be located at a rear of the pair of pressing rollers (510).

Also, in the mono-cell manufacturing apparatus according to the present invention, the first separator (110) may include a Safety Reinforced Separator (SRS) constituted by inorganic particles.

In addition, a mono-cell manufacturing method according to the present invention includes a step (S1) of supplying a first separator (110) and seating a negative electrode (210) on an upper surface of the first separator (110), a step (S2) of supplying a second separator (310) to an upper surface of the negative electrode (210) and seating a positive electrode (410) on an upper surface of the second separator (310), a step (S3) of pressing the first separator (110), the negative electrode (210), the second separator (310), and the positive electrode (410) to form a stack, and a step (S4) of cutting the stack at predetermined intervals to prepare a mono-cell, wherein a step of measuring glossiness of the first separator (110) is further performed after step S3.

Also, in the manufacturing method according to the present invention, the step of measuring glossiness may be performed after step S4.

In addition, the manufacturing method according to the present invention may further include a step (S5) of determining that the mono-cell is normal when the measured glossiness is within a predetermined range and determining that the mono-cell is defective when the measured glossiness deviates from the predetermined range.

Also, in the manufacturing method according to the present invention, a normal range and a defective range of the glossiness may be set from the force of adhesion between the first separator (110) and the negative electrode (210) and permeability of the first separator (110) and the negative electrode (210).

In addition, the present invention provides a mono-cell manufactured by the mono-cell manufacturing method.

Advantageous Effects

As is apparent from the above description, a mono-cell manufacturing apparatus with a gloss meter according to the present invention and a manufacturing method using the same have an advantage in that glossiness of an inorganic particle layer of a separator is measured through the gloss meter and a determination is made whether a mono-cell is defective based thereon, whereby measurement is very conveniently performed and inspection is rapidly performed.

In addition, the mono-cell manufacturing apparatus with the gloss meter according to the present invention and the manufacturing method using the same have a merit in that, when a manufactured mono-cell is defective, it is possible to take rapid measures, whereby it is possible to reduce discarded quantity due to manufacturing defect, and therefore it is possible to reduce manufacturing cost.

DESCRIPTION OF DRAWINGS

FIG. 6 is a view showing the results of measurement of glossiness of a plurality of samples.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a mono-cell manufacturing apparatus with a gloss meter according to the present invention and a manufacturing method using the same will be described with reference to the accompanying drawings.

Figure 1:
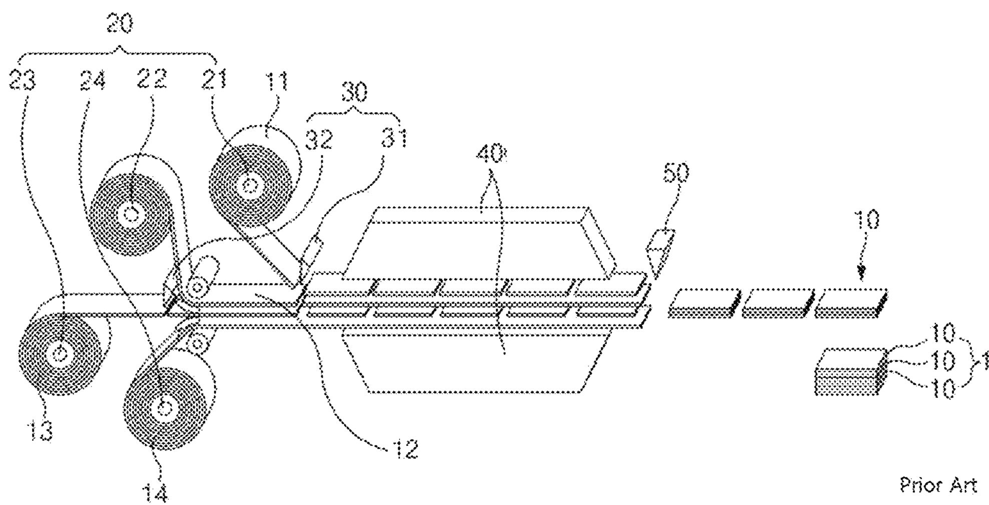
FIG. 1 is a perspective view of a conventional mono-cell manufacturing apparatus.
Figure 2:
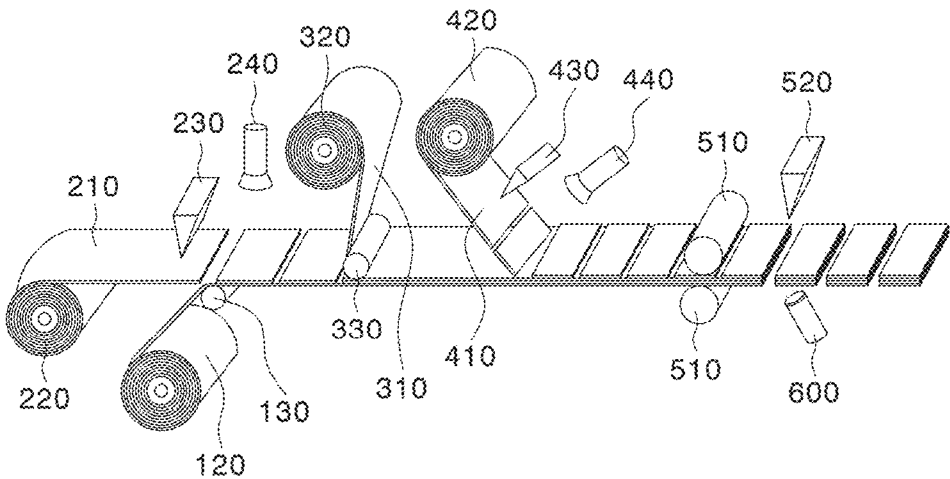
FIG. 2 is a perspective view of a mono-cell manufacturing apparatus according to a preferred embodiment of the present invention.
Figure 3:
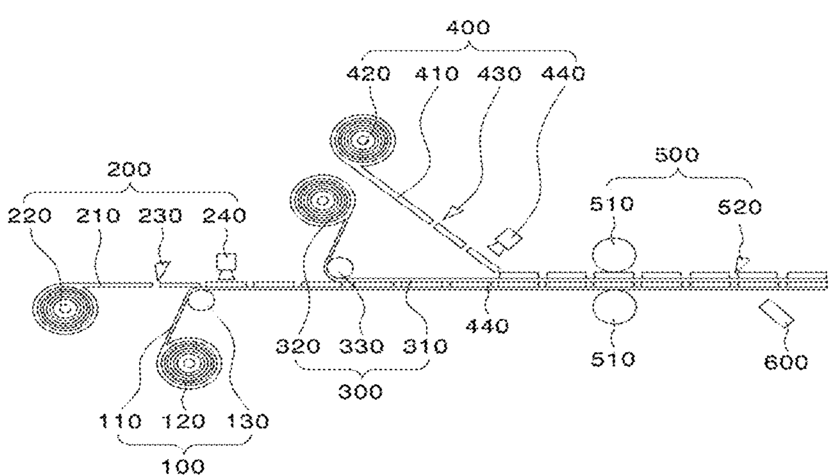
FIG. 3 is a front view of the mono-cell manufacturing apparatus shown in FIG. 2.

FIG. 2 is a perspective view of a mono-cell manufacturing apparatus according to a preferred embodiment of the present invention, and FIG. 3 is a front view of the mono-cell manufacturing apparatus shown in FIG. 2.

Referring to FIGS. 2 and 3, the mono-cell manufacturing apparatus according to the preferred embodiment of the present invention includes a first separator supply unit 100, a negative electrode supply unit 200, a second separator supply unit 300, a positive electrode supply unit 400, a pressing unit 500, and a gloss meter 600.

When describing the first separator supply unit 100 first in detail, the first separator supply unit includes a first separator 110 configured to be supplied to the mono-cell manufacturing apparatus, a first separator supply roller 120 having the first separator 110 wound therearound, and a first guide roller 130 configured to guide the first separator 110 so as to be transferred in a horizontal direction.

Here, an insulative thin film that exhibits high ionic permeability and mechanical strength is used as the first separator 110. The separator generally has a pore diameter of 0.01 to 10 μm and a thickness of 5 to 300 μm. As the separator, for example, a sheet or non-woven fabric made of an olefin-based polymer, such as polypropylene, which exhibits chemical resistance and hydrophobicity, glass fiber, or polyethylene is used. Furthermore, the separator may be a safety reinforced separator (SRS separator).

The SRS separator is manufactured by disposing inorganic particles and a binder polymer, as active layer ingredients, on an olefin-based separator substrate, and therefore the SRS separator has a uniform porous structure due to a porous structure included in the separator substrate and interstitial volume between the inorganic particles, which are one of the active layer ingredients.

In the case in which the SRS separator is used, there is an advantage in that it is possible to inhibit an increase in thickness of a battery due to swelling at the time of formation, compared to the case in which an ordinary separator is used. In the case in which a polymer capable of being gelled at the time of impregnation with a liquid electrolyte solution is used as a binder polymer ingredient, the SRS separator may also be used as an electrolyte.

In addition, the SRS separator may exhibit excellent adhesive force characteristics by adjusting the content of the inorganic particles and the binder polymer, which are the active layer ingredients in the separator, whereby it is possible to easily perform a battery assembly process.

Here, the inorganic particles are not particularly restricted as long as the inorganic particles are electrochemically stable. It is preferable for the inorganic particles not to be oxidized and/or reduced within an operation voltage range of the battery (e.g. 0 to 5 V based on $Li/Li+$). In the case in which inorganic particles having ion transport ability are used, it is more preferable for the inorganic particles to have as high ionic conductivity as possible, since it is possible to increase ionic conductivity in an electrochemical device, whereby it is possible to improve performance of the battery.

The negative electrode supply unit 200 includes a negative electrode 210 configured to be seated on an upper surface of the first separator 110, a negative electrode supply roller 220 having the negative electrode 210 wound therearound, a first cutting unit 230 configured to cut the negative electrode 210 at predetermined intervals, and a first vision camera 240 configured to check the negative electrode 210 that has been cut and seated on the upper surface of the first separator 110.

Here, the negative electrode is manufactured by applying a negative electrode active material to a negative electrode current collector and drying the negative electrode active material. The negative electrode is a known construction, and therefore a detailed description thereof will be omitted.

The first cutting unit 230 cuts the negative electrode in order to obtain a mono-cell having a predetermined size, and the first vision camera 240 determines whether the cut negative electrode is accurately seated at a desired position.

As an example, the first vision camera 240 processes an image obtained through image capturing performed by the camera to inspect whether the negative electrode 210 seated on the first separator 110 is within a predetermined displacement range. The construction of the vision camera and the principle by which the vision camera is operated are known, and therefore a more detailed description thereof will be omitted.

The second separator supply unit 300 includes a second separator 310 configured to be supplied so as to cover an upper surface of the negative electrode 210, a second separator supply roller 320 having the second separator 310 wound therearound, and a second guide roller 330 configured to guide the second separator 310 so as to be transferred in the horizontal direction.

Here, the second separator 310 may be a generally known separator or an SRS separator, like the first separator 110.

The positive electrode supply unit 400 includes a positive electrode 410 configured to be seated on an upper surface of the second separator 310, a positive electrode supply roller 420 having the positive electrode 410 wound therearound, a second cutting unit 430 configured to cut the positive electrode 410 at predetermined intervals, and a second vision camera 440 configured to check the positive electrode 410 that has been cut and seated on the upper surface of the second separator 310.

Here, the positive electrode is manufactured by applying a mixture of a positive electrode active material, a conductive agent, and a binder to a positive electrode current collector and drying the mixture. A filler is further added as needed. These are known constructions, and therefore a detailed description thereof will be omitted.

The second cutting unit 430 cuts the roll type positive electrode in order to obtain a mono-cell having a predetermined size, and the second vision camera 440 is identical in operation to the first vision camera 240 except that only installation positions thereof are different from each other. The second vision camera inspects whether the positive electrode 410 seated on the second separator 310 is within a predetermined displacement range.

The pressing unit 500, which is provided for a lamination process, includes a pair of pressing rollers 510 configured to press a stack constituted by the first separator 110, the negative electrode 210, the second separator 310, and the positive electrode 410 stacked from below in that order at a predetermined pressure in an upward-downward direction and a third cutting unit 520 configured to cut the first separator 110 and the second separator 310 at predetermined intervals.

Here, the pair of pressing rollers 510 presses the first separator 110, the negative electrode 210, the second separator 310, and the positive electrode 410 so as to be adhered to each other. Heating wires configured to heat the pressing rollers to a predetermined temperature may be mounted to the pressing rollers.

Meanwhile, the third cutting unit 520 cuts the stack constituted by the first separator 110, the negative electrode 210, the second separator 310, and the positive electrode 410 stacked in that order to obtain a mono-cell having a predetermined size.

It is preferable for the gloss meter 600 to be located at the rear of the pair of pressing rollers 510, and it is more preferable for the gloss meter to be provided under the first separator 110 while being located at the rear of the third cutting unit 520 in the vicinity thereof in order to measure gloss of one surface of the first separator 110, i.e. a lower side of the first separator 110.

Conventionally, there are problems in that adhesive force and permeability of a negative electrode, a separator, and a positive electrode constituting a mono-cell are measured to determine whether the mono-cell is defective, whereby measurement is difficult and much measurement time is necessary.

In contrast, in the present invention, glossiness of the first separator 110 is measured to determine whether the mono-cell is defective, whereby measurement may be very conveniently and rapidly performed.

That is, the size of an inorganic particle layer of the separator is changed by pressure and heat during a pressing process, which affects permeability and adhesive force of the separator. Consequently, glossiness of the inorganic particles is measured to determine the degree of deformation thereof, and eventually it is possible to check changes in permeability and adhesive force of the separator.

Of course, it is obvious that, in order to predict permeability and adhesive force of the separator from glossiness of the inorganic particles, it is necessary to secure the relationship therebetween in advance.

Figure 4:
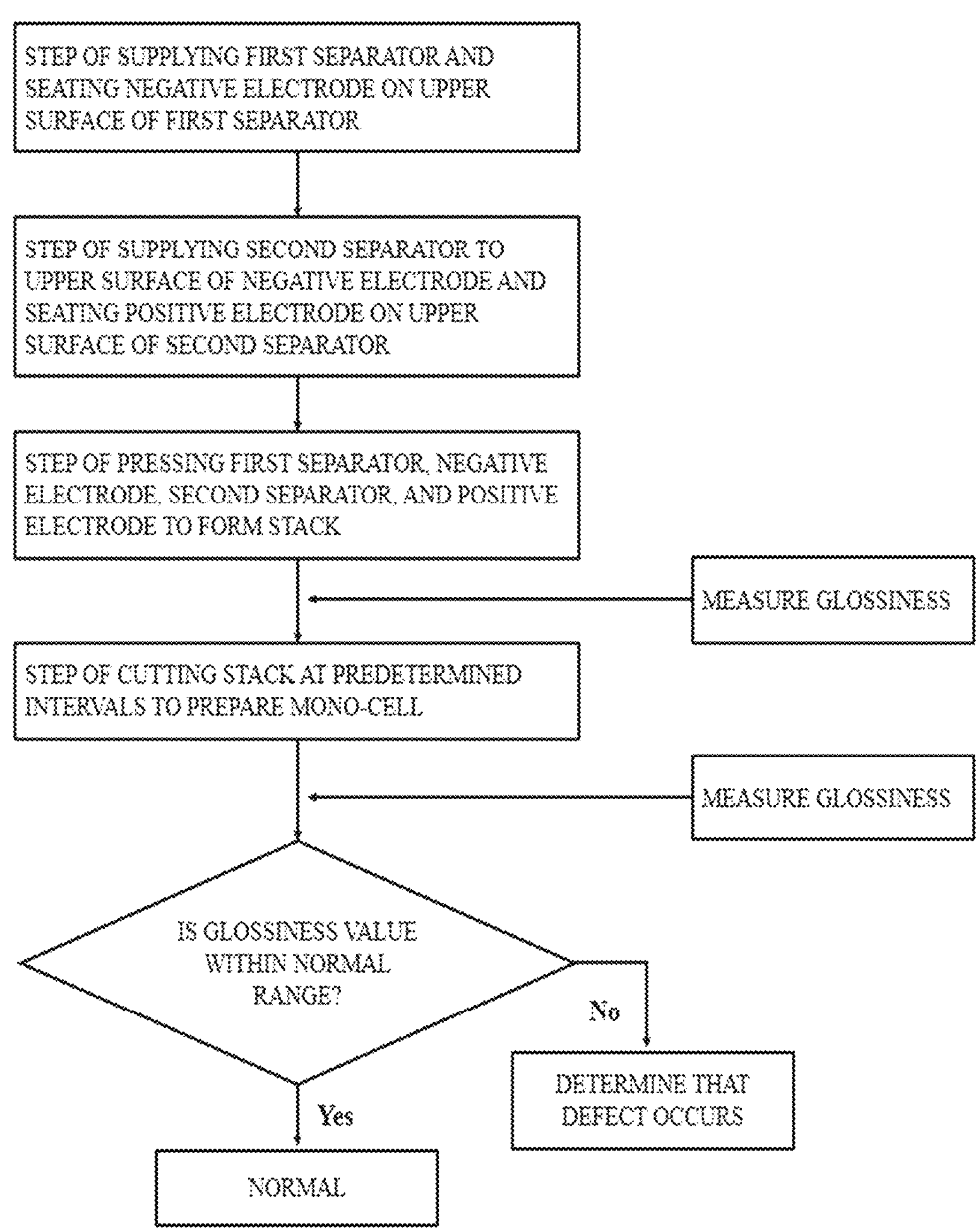
FIG. 4 is a flowchart illustrating a mono-cell manufacturing method according to a preferred embodiment of the present invention.
Figure 5:
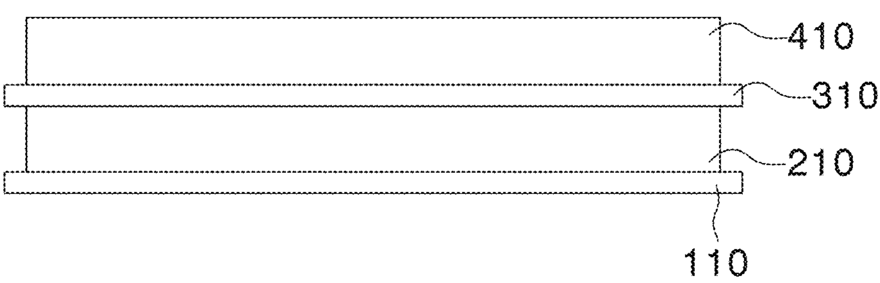
FIG. 5 is a sectional view of a mono-cell according to a preferred embodiment of the present invention.

FIG. 4 is a flowchart illustrating a mono-cell manufacturing method according to a preferred embodiment of the present invention, and FIG. 5 is a sectional view of a mono-cell according to a preferred embodiment of the present invention.

Referring to FIG. 4, the mono-cell manufacturing method using the manufacturing apparatus described above includes a step (S1) of seating a negative electrode 210 on an upper surface of a first separator 110 while supplying the first separator 110, a step (S2) of seating a positive electrode 410 on an upper surface of a second separator 310 while supplying the second separator 310 to an upper surface of the negative electrode 210, a step (S3) of pressing the first separator 110, the negative electrode 210, the second separator 310, and the positive electrode 410 to form a stack, a step (S4) of cutting the stack at predetermined intervals to prepare a mono-cell, and a step (S5) of measuring glossiness of the first separator 110, determining that the mono-cell is normal when a measured value is within a predetermined range, and determining that the mono-cell is defective when the measured value deviates from the predetermined range.

First, the step (S1) of seating a negative electrode 210 on an upper surface of a first separator 110 while supplying the first separator 110 is a step of supplying a first separator 110 wound around a first separator supply roller 120 and at the same time seating negative electrodes 210 cut at predetermined intervals on an upper surface of the first separator 110.

Here, the first separator 110 is transferred and supplied by a first guide roller 130 in a horizontal direction.

At this time, it is preferable to further perform a step of checking whether the negative electrode 210 supplied to the upper surface of the first separator 110 is seated at a predetermined position through a first vision camera 240.

The step (S2) of seating a positive electrode 410 on an upper surface of a second separator 310 while supplying the second separator 310 to an upper surface of the negative electrode 210 is a step of seating a second separator 310 wound around a second separator supply roller 320 on an upper surface of the negative electrode 210 and seating positive electrodes 410 cut at predetermined intervals by a second cutting unit 430 on an upper surface of the seated second separator 310.

Here, the second separator 310 is transferred and supplied by a second guide roller 330 in the horizontal direction, and the positive electrodes 410 cut at the predetermined intervals are seated at the same vertical positions as the negative electrodes 210.

At this time, it is preferable to further perform a step of checking whether the positive electrode 410 supplied to the upper surface of the second separator 310 is seated at a predetermined position through a second vision camera 440.

The step (S3) of pressing the first separator 110, the negative electrode 210, the second separator 310, and the positive electrode 410 to form a stack is a step of pressing a stack constituted by the first separator 110, the negative electrode 210, the second separator 310, and the positive electrode 410 stacked from below in that order using pressing rollers 510 so as to be brought into tight contact with each other and to be adhered to each other.

At this time, it is preferable to heat the stack to a predetermined temperature in order to increase adhesive force thereof.

The step (S4) of cutting the stack at predetermined intervals to prepare a mono-cell is a step of cutting the first separator 110 and the second separator 310 of the stack obtained in step S3 using a third cutting unit 520 to obtain a mono-cell.

Finally, step S5 is a step of determining whether the mono-cell obtained in step S4 is defective. Specifically, glossiness of the first separator 110 is measured. When a measured value is within a predetermined range, i.e. within a reference value based on a predetermined relationship between glossiness, permeability, and adhesive force, a determination is made that the mono-cell is normal. When the measured value deviates from predetermined range, a determination is made that the mono-cell is defective.

When the measured glossiness is within the predetermined range, a determination is made that the mono-cell is normal, and therefore a mono-cell manufacturing process is continuously performed. Upon determining that the mono-cell is defective, the manufacturing process is interrupted, and measures, such as cause analysis, are taken.

Meanwhile, the mono-cell is not necessarily measured after being cut by the third cutting unit 520. For example, after glossiness is measured, only when a measured value is within a normal range, the stack may be cut to form a mono-cell; however, it is more preferable to measure glossiness after the cutting process in consideration of a phenomenon in which the stack is pressed that may occur during the cutting process.

FIG. 5 is a sectional view of a mono-cell according to a preferred embodiment of the present invention. In a mono-cell obtained through the above method, a first separator 110, a negative electrode 210, a second separator 310, and a positive electrode 410 are stacked in that order, and a plurality of mono-cells may be stacked to constitute a battery cell.

Hereinafter, the present invention will be described with reference to the following example. The example is provided only for easier understanding of the present invention and should not be construed as limiting the scope of the present invention.

EXAMPLE

A mono-cell constituted by a first separator, a negative electrode, a second separator, and a positive electrode stacked from below in that order was manufactured using the apparatus shown in FIG. 3.

Here, the positive electrode was prepared by coating opposite surfaces of thin aluminum foil with a positive electrode mixture including a nickel-manganese-cobalt-based positive electrode active material, a binder, and a conductive agent and drying the positive electrode mixture. The separator was prepared by coating opposite surfaces of a separator substrate having a porous structure made of polypropylene with a coating slurry including $Al_2O_3$ inorganic particles and a PVDF binder and drying the coating slurry.

In addition, the negative electrode was prepared by coating opposite surfaces of thin copper foil with a negative electrode mixture including a graphite-based negative electrode active material, a binder, and a conductive agent and drying the negative electrode mixture.

Meanwhile, in a lamination process of the mono-cell constituted by the first separator, the negative electrode, the second separator, and the positive electrode stacked in that order, pressing was performed within a range of 300 to 350 kgf using a pair of pressing rollers. Subsequently, cutting was performed at predetermined intervals to prepare a plurality of mono-cells.

Experimental Example

Measurement of Glossiness

The second separator and the positive electrode were peeled off from each of the prepared mono-cells to prepare a sample for measurement in the state in which the first separator and the negative electrode were in tight contact with each other, and glossiness of the first separator was measured.

A total of three points of the same sample, e.g. the middle and opposite edges of the sample, were measured. A BYK gloss meter (Model No. AG-4563) was used as a gloss meter, and measurement was performed at 60°, which is standard gloss.

Measurement of Permeability

Permeability was measured on the same sample used to measure glossiness. Here, a permeability measurement target was the first separator in the state in which the negative electrode was separated therefrom. In order to remove the $Al_2O_3$ inorganic particles and the PVDF binder, washing using acetone and drying were performed, and measurement was performed using a permeability measurement instrument (EG01-55-1MR from Asahi Seiko Company).

Measurement of Adhesive Force

The force of adhesion between the negative electrode and the separator was measured according to ASTM D3330 on the same sample used to measure glossiness. Specifically, a double-sided adhesive tape was attached to slide glass, and the surface of the negative electrode of the prepared sample was attached to the adhesive tape. Subsequently, force necessary to separate the negative electrode and the separator from each other was measured through a 90° peeling method using a universal testing machine (UTM) at a speed of 100 mm/min.

Figure 6:
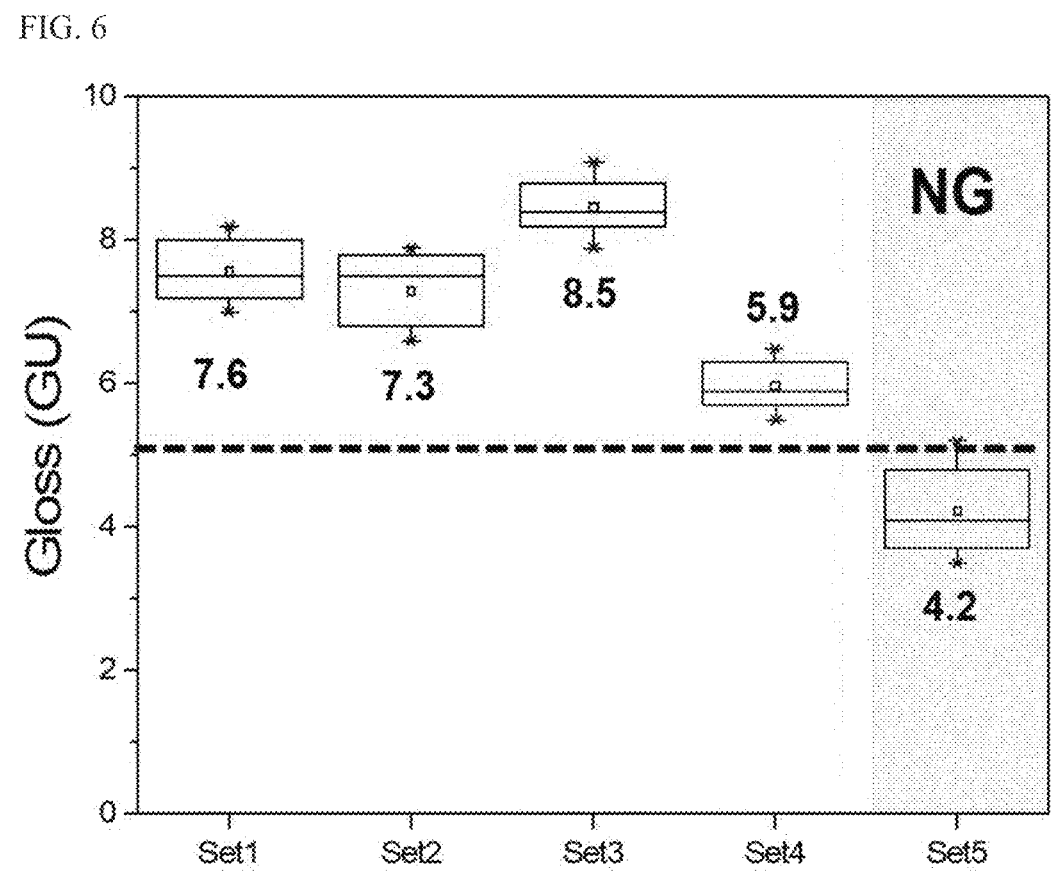
Figure 7:
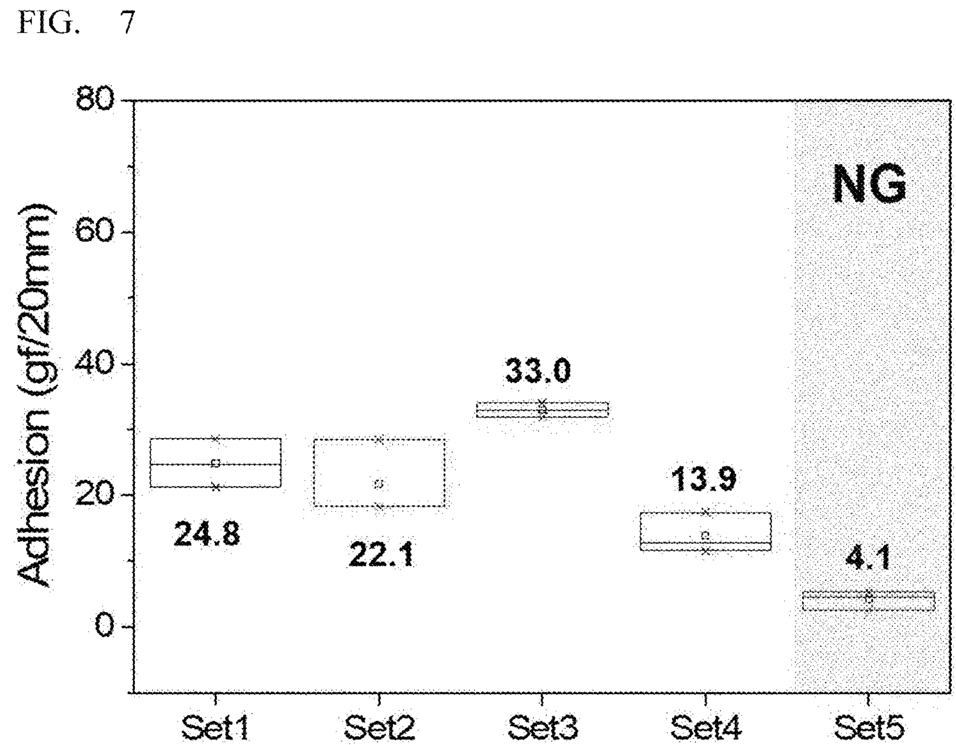
FIG. 7 is a view showing the result of measurement of the force of adhesion between a negative electrode and a separator of each of the plurality of samples.
Figure 8:
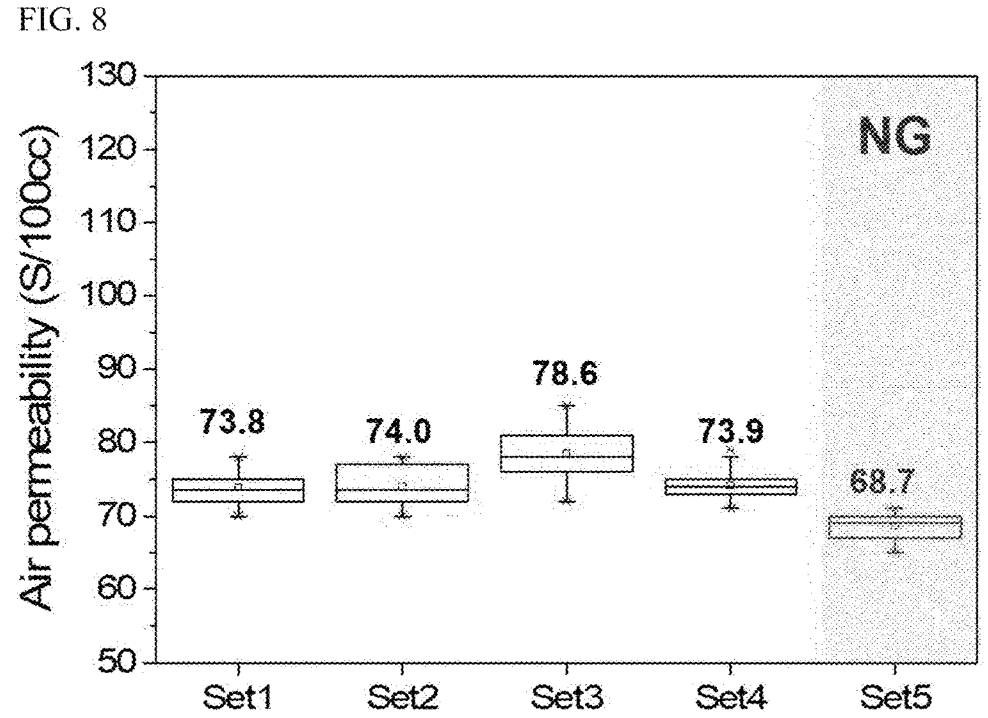
FIG. 8 is a view showing the results of measurement of permeability of the plurality of samples.

FIG. 6 is a view showing the results of measurement of glossiness of the plurality of samples, FIG. 7 is a view showing the results of measurement of the force of adhesion between the negative electrodes and the separators of the plurality of samples, and FIG. 8 is a view showing the results of measurement of permeability of the plurality of samples.

First, the results of measurement of glossiness show that Set 1 to Set 4 have a minimum average of 5.9 GU to a maximum average of 8.5 GU and Set 5 has an average of 4.2 GU.

Meanwhile, the results of measurement of the force of adhesion between the negative electrodes and the separators show that Set 1 to Set 4 have an average force of adhesion of 13.9 to 33.0 gf/20 mm, whereas Set 5 has an average force of adhesion of 4.1 gf/20 mm.

In addition, the results of measurement of permeability (time necessary for 100 cc of gas to pass through a sample having a diameter of 5 cm) show that Set 5 has an average permeability of 68.7 S/100 cc, which is much lower than an average permeability of 73.8 to 78.6 S/100 cc of Set 1 to Set 4.

In consideration of the fact that adhesive force and permeability required under conditions of Example are 10 gf/20 mm or more and 70 S/100 cc or more, respectively, the samples corresponding to Set 5 are defective products.

Even though only glossiness of the separator of the manufactured mono-cell is measured without measurement of the force of adhesion between the negative electrode and the separator or permeability of the separator, as described above, it is possible to determine whether the sample is defective.

Of course, required adhesive force or permeability may vary depending on changes in physical properties of the negative electrode, the separator, and the positive electrode. In the case in which the relationship between glossiness, permeability, and adhesive force is prepared in advance, however, it is possible to determine whether the mono-cell is normal or defective only through measurement of glossiness.

Those skilled in the art to which the present invention pertains will appreciate that various applications and modifications are possible within the category of the present invention based on the above description.

DESCRIPTION OF REFERENCE NUMERALS

- 100: First separator supply unit
- 110: First separator
- 120: First separator supply roller
- 130: First guide roller
- 200: Negative electrode supply unit
- 210: Negative electrode
- 220: Negative electrode supply roller
- 230: First cutting unit
- 240: First vision camera
- 300: Second separator supply unit
- 310: Second separator
- 320: Second separator supply roller
- 330: Second guide roller
- 400: Positive electrode supply unit
- 410: Positive electrode
- 420: Positive electrode supply roller
- 430: Second cutting unit
- 440: Second vision camera
- 500: Pressing unit
- 510: Pressing roller
- 520: Third cutting unit
- 600: Gloss meter

The invention claimed is:

1. A mono-cell manufacturing apparatus comprising:

a first separator supply unit configured to supply a first separator along a path;

a negative electrode supply unit configured to position a negative electrode on an upper surface of the first separator;

a second separator supply unit configured to supply a second separator configured to cover an upper surface of the negative electrode;

a positive electrode supply unit configured to position a positive electrode on an upper surface of the second separator;

a pressing unit configured to press the first separator, the negative electrode, the second separator, and the positive electrode; and a gloss meter located under the path of the first separator on an opposite side of the pressing unit from the first separator supply unit.

2. The mono-cell manufacturing apparatus according to claim 1, wherein the first separator supply unit comprises:

a first separator supply roller having the first separator wound therearound; and a first guide roller configured to guide transfer of the first separator along the path.

3. The mono-cell manufacturing apparatus according to claim 1, wherein the negative electrode supply unit comprises:

a negative electrode supply roller having the negative electrode wound therearound;

a first cutting unit configured to cut the negative electrode at predetermined intervals; and a first vision camera configured to check a seated position of the negative electrode on the first separator.

4. The mono-cell manufacturing apparatus according to claim 1, wherein the second separator supply unit comprises:

a second separator supply roller having the second separator wound therearound; and a second guide roller configured to guide transfer of the second separator along the path.

5. The mono-cell manufacturing apparatus according to claim 1, wherein the positive electrode supply unit comprises:

a positive electrode supply roller having the positive electrode wound therearound;

a second cutting unit configured to cut the positive electrode at predetermined intervals; and a second vision camera configured to check a seated position of the positive electrode on the second separator.

6. The mono-cell manufacturing apparatus according to claim 1, wherein the pressing unit comprises:

a pair of pressing rollers configured to press a stack, the stack including the first separator, the negative electrode, the second separator, and the positive electrode stacked in order, wherein the pair of pressing rollers are configured to press the stack at a predetermined pressure; and a third cutting unit configured to cut the first separator and the second separator at predetermined intervals.

7. The mono-cell manufacturing apparatus according to claim 1, wherein the first separator comprises an SRS having inorganic particles.

8. A mono-cell manufacturing apparatus comprising:

a first separator supply unit configured to supply a first separator along a path;

a negative electrode supply unit configured to position a negative electrode on an upper surface of the first separator;

a second separator supply unit configured to supply a second separator configured to cover an upper surface of the negative electrode;

a positive electrode supply unit configured to position a positive electrode on an upper surface of the second separator;

a pressing unit configured to press the first separator, the negative electrode, the second separator, and the positive electrode; and a gloss meter located under the path of the first separator, wherein the pressing unit comprises:

a pair of pressing rollers configured to press a stack, the stack including the first separator, the negative electrode, the second separator, and the positive electrode stacked in order, wherein the pair of pressing rollers are configured to press the stack at a predetermined pressure, and a third cutting unit configured to cut the first separator and the second separator at predetermined intervals, and wherein the gloss meter is located on an opposite side of the pair of pressing rollers from the first separator supply unit.

* * * * *